United States Patent
Kurosaki

(10) Patent No.: US 7,035,388 B2
(45) Date of Patent: Apr. 25, 2006

(54) CALLER IDENTIFYING METHOD, PROGRAM, AND APPARATUS AND RECORDING MEDIUM

(75) Inventor: Kiyoshi Kurosaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 10/267,590

(22) Filed: Oct. 10, 2002

(65) Prior Publication Data

US 2003/0228007 A1    Dec. 11, 2003

(30) Foreign Application Priority Data

Jun. 10, 2002    (JP)    ............... 2002-168126

(51) Int. Cl.
   *H04M 15/06*    (2006.01)
   *H04M 1/64*    (2006.01)
   *H04M 11/00*    (2006.01)

(52) U.S. Cl. ............... 379/142.06; 379/142.01; 379/142.04; 379/88.19; 379/93.23

(58) Field of Classification Search ........... 379/142.01, 379/142.04, 142.05, 142.06, 142.07, 9.02, 379/9.03, 207.15, 208.01, 214.01, 265.01, 379/265.02, 266.01, 88.11, 88.19, 88.2, 93.23, 379/88.01; 455/415

See application file for complete search history.

(56) References Cited

U.S. PATENT DOCUMENTS

| | | | | |
|---|---|---|---|---|
| 5,625,682 A * | 4/1997 | Gray et al. | ............ | 379/207.16 |
| 5,684,870 A * | 11/1997 | Maloney et al. | ........ | 379/212.01 |
| 5,970,132 A * | 10/1999 | Brady | ................... | 379/212.01 |
| 6,522,743 B1 * | 2/2003 | Hurd | ..................... | 379/266.04 |
| 6,542,601 B1 * | 4/2003 | Hernandez et al. | .... | 379/265.01 |
| 6,628,755 B1 * | 9/2003 | Shimada et al. | ........... | 379/9.04 |
| 6,798,872 B1 * | 9/2004 | Matsumoto et al. | ... | 379/142.01 |
| 6,829,349 B1 * | 12/2004 | Neale et al. | ........... | 379/265.09 |

* cited by examiner

*Primary Examiner*—Quoc Tran
(74) *Attorney, Agent, or Firm*—Staas & Halsey LLP

(57) ABSTRACT

A caller number received from an exchange machine by a telephone coordination server (CTI server) is noticed to a customer database to search for caller information. When pieces of caller information are acquired from the customer database by the telephone coordination server, the exchange machine is connected to a voice automatic response device (IVR device) to acquire predetermined voice data by telephone communication with a caller, and the voice data is compared with voice data included in the caller information by a voice recognition server to generate caller candidate information having priority levels. On the basis of caller candidate information, caller information of a first candidate is displayed on an operator client, candidate names of second and subsequent candidates are displayed as a list, and an operation of selecting a candidate in the displayed list is caused to change the caller information being displayed at the present into caller information of a selected candidate.

12 Claims, 19 Drawing Sheets

FIG. 3A

| CUSTOMER NUMBER | NAME | DISCRIMINATION DATA |
|---|---|---|
| aaaa | FUJITSU TARO | ADDRESS・SEX・AGE・HOBBY・TRANSACTION HISTORY |
| bbbb | FUJITSU HANAKO | ADDRESS・SEX・AGE・HOBBY・TRANSACTION HISTORY |
| cccc | FUJITSU JIRO | ADDRESS・SEX・AGE・HOBBY・TRANSACTION HISTORY |
| dddd | FUJI TARO | ADDRESS・SEX・AGE・HOBBY・TRANSACTION HISTORY |

FIG. 3B

| CALLER NUMBER | VOICE DATA | CUSTOMER NUMBER |
|---|---|---|
| 044-754-4119 | SATO TADASHI | xxxx |
| 044-777-1111 | FUJITSU TARO | cccc |
| 044-777-1111 | FUJI TARO | dddd |
| 045-666-7777 | YAMADA TARO | yyyy |
| 044-777-1111 | FUJITSU TARO | aaaa |

FIG. 4

| CALLER NUMBER | VOICE DATA | CUSTOMER NUMBER |
|---|---|---|
| 044-777-1111 | FUJITSU JIRO | cccc |
| 044-777-1111 | FUJI TARO | dddd |
| 044-777-1111 | FUJITSU TARO | aaaa |

FIG. 5

| PRIORITY LEVEL | NAME | CUSTOMER NUMBER |
|---|---|---|
| 1 | FUJITSU TARO | aaaa |
| 2 | FUJITSU JIRO | cccc |
| 3 | FUJI TARO | dddd |

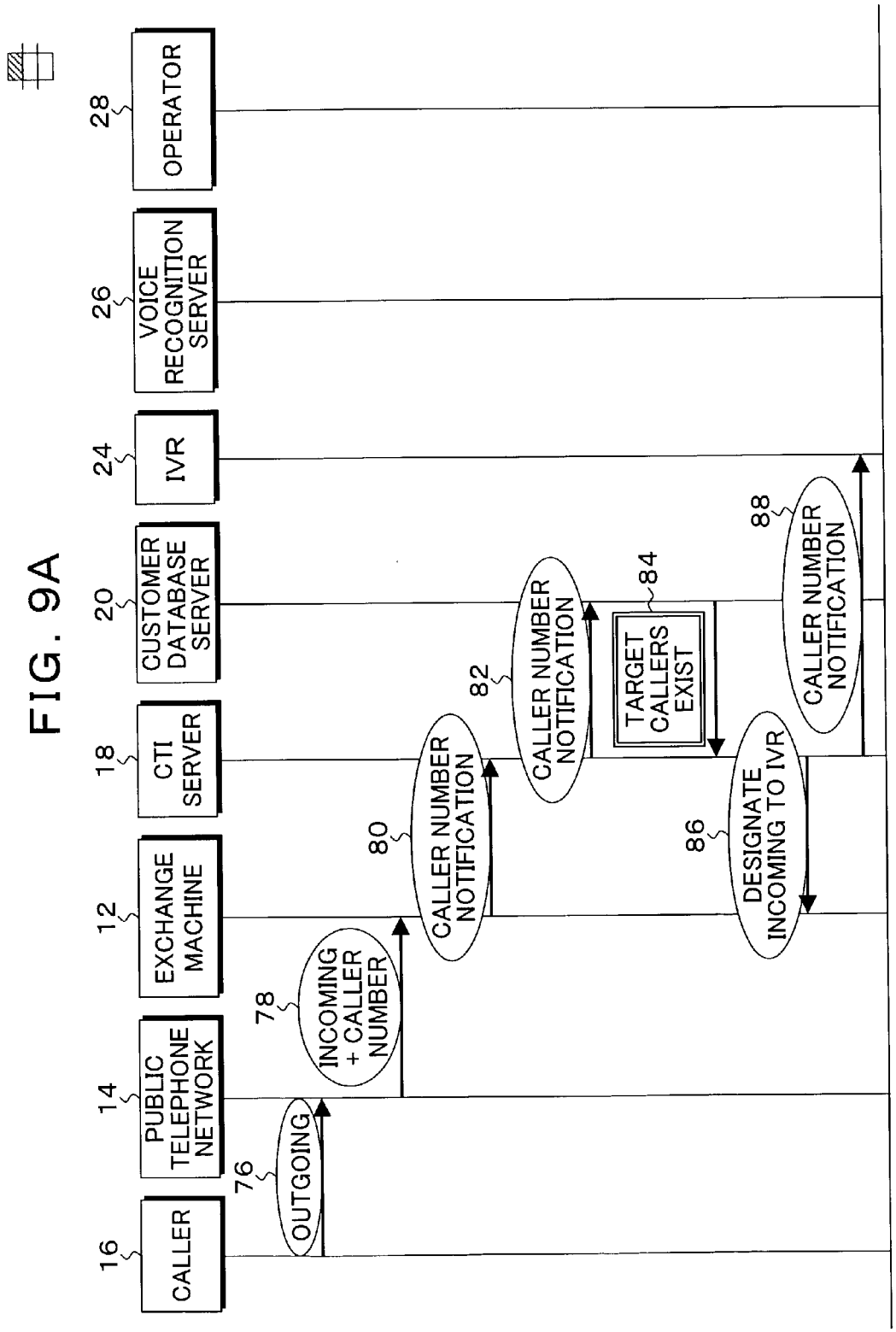

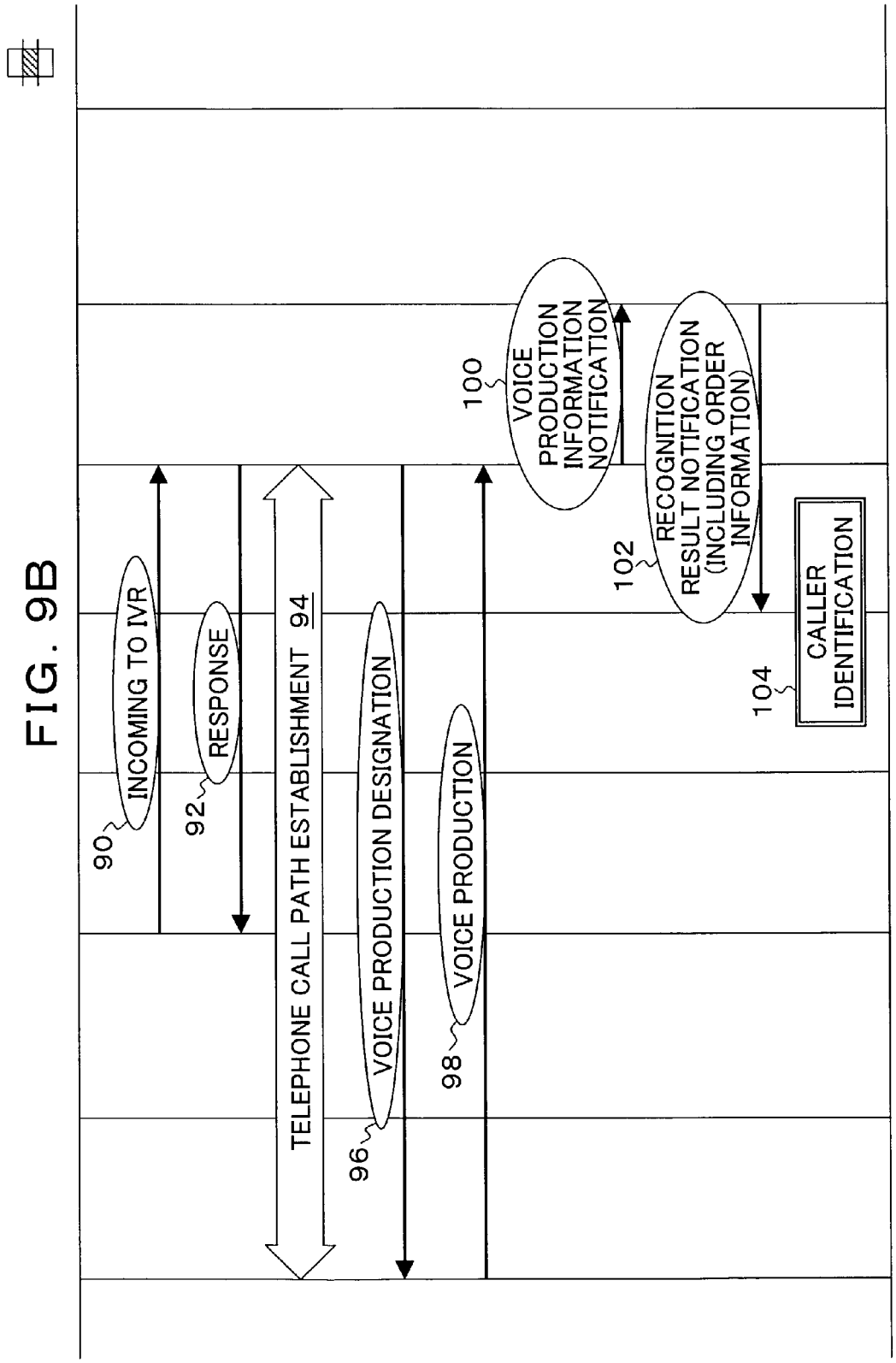

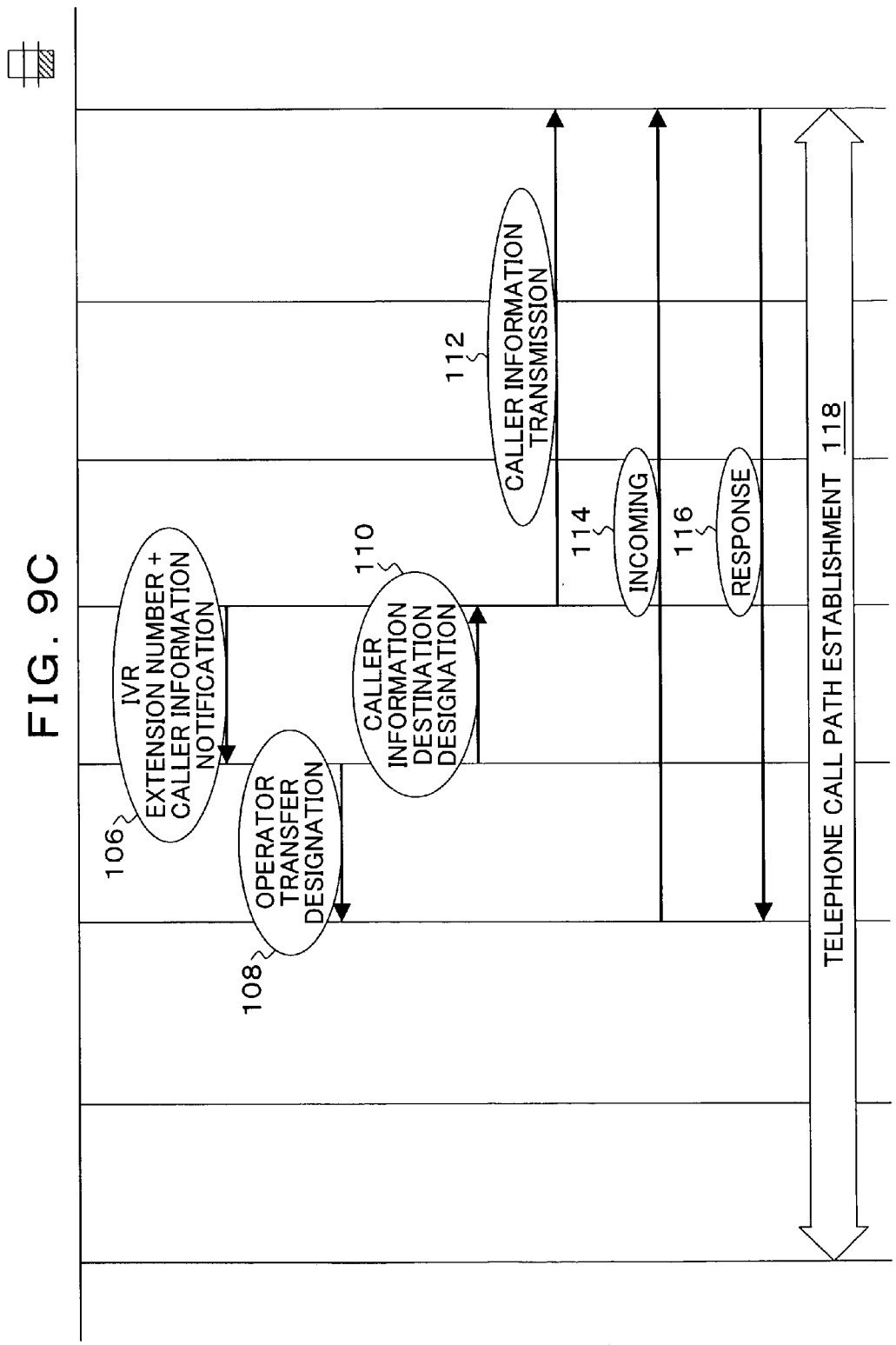

FIG. 10A
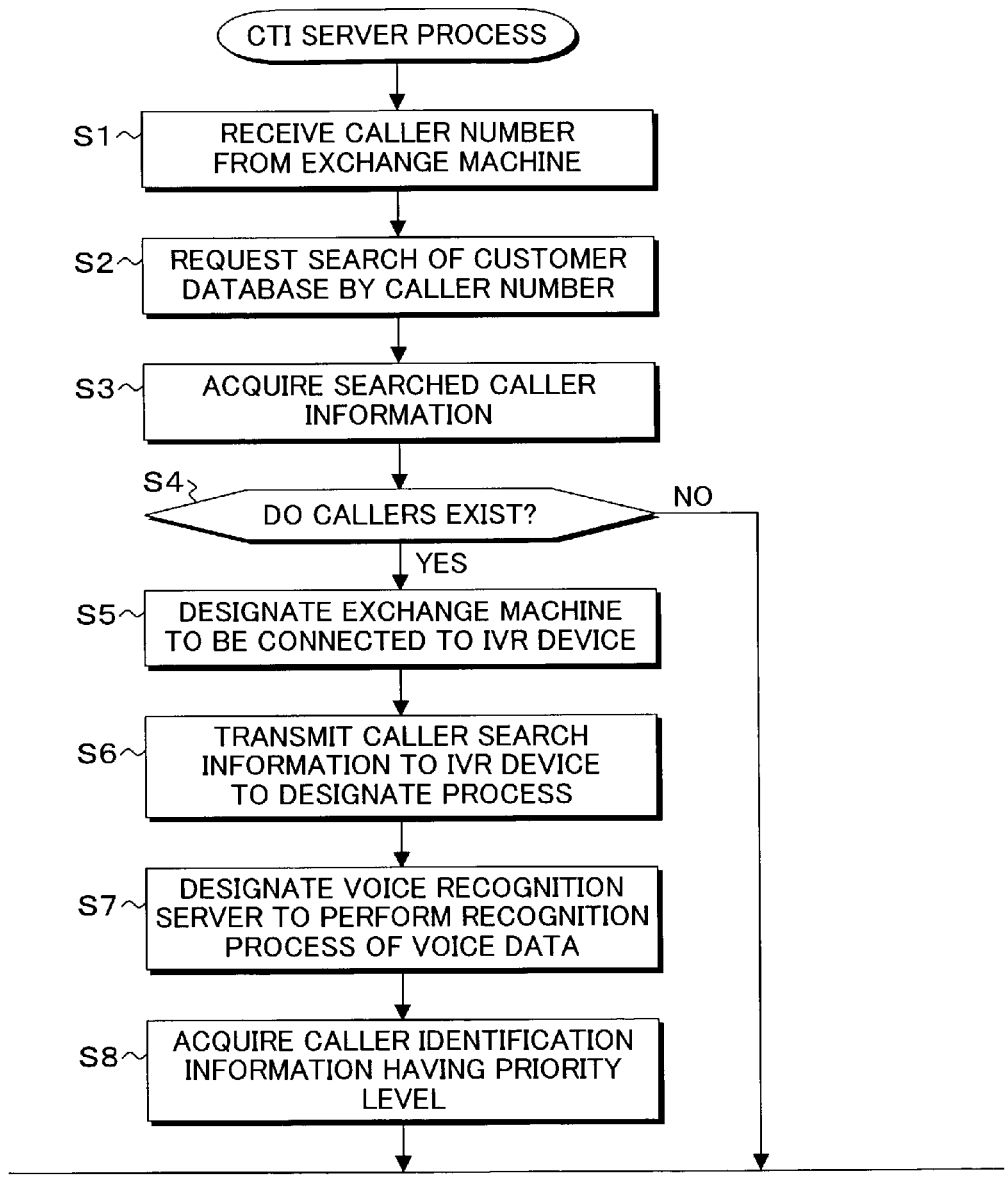

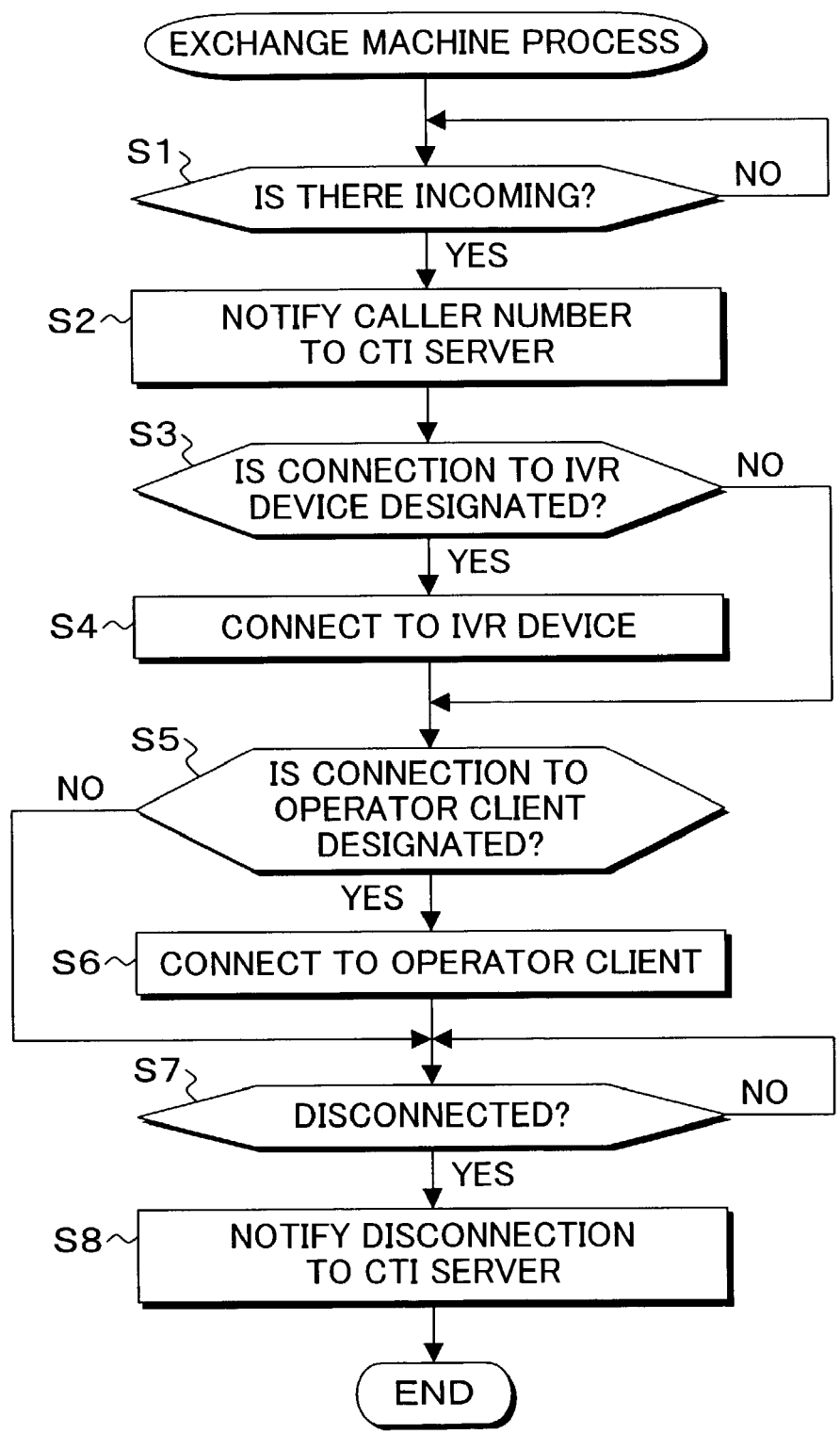

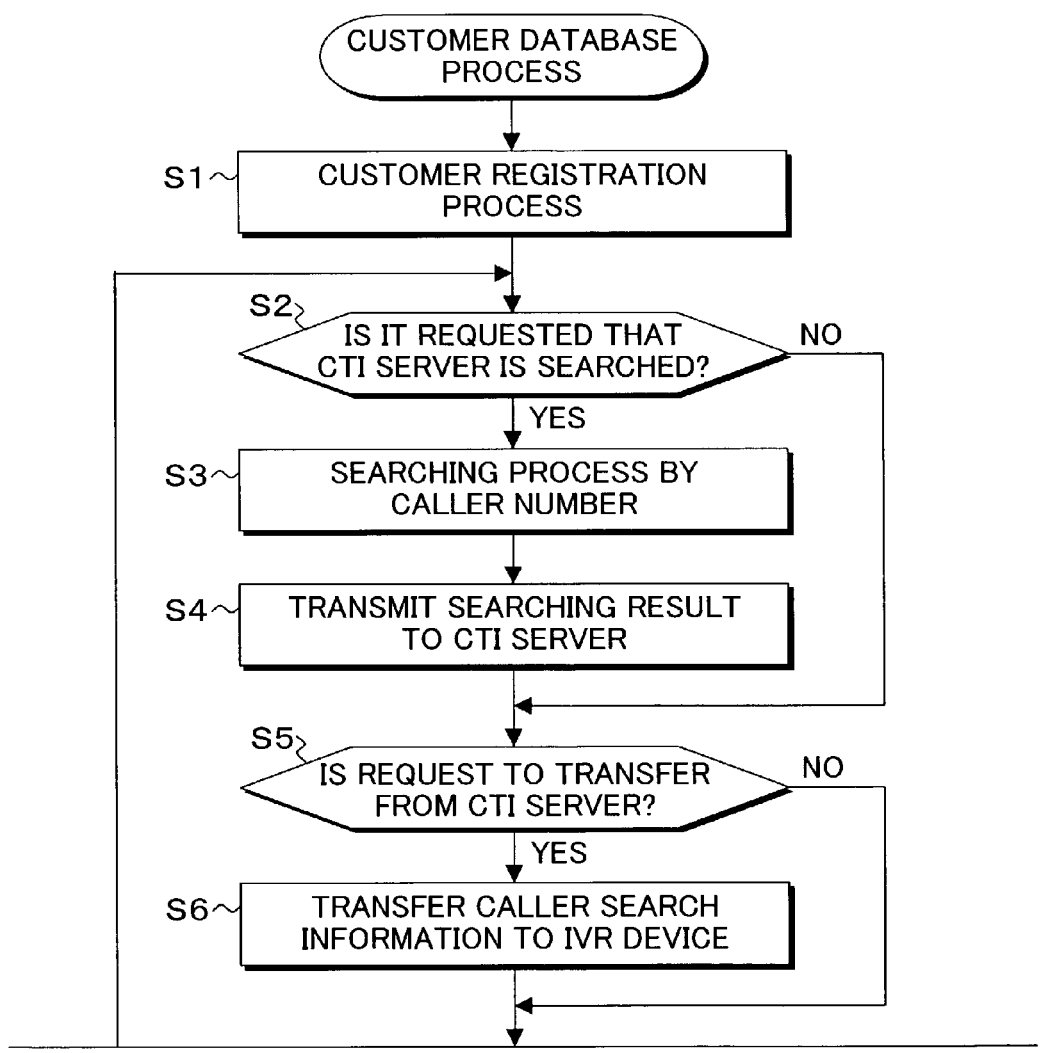
FIG. 12A

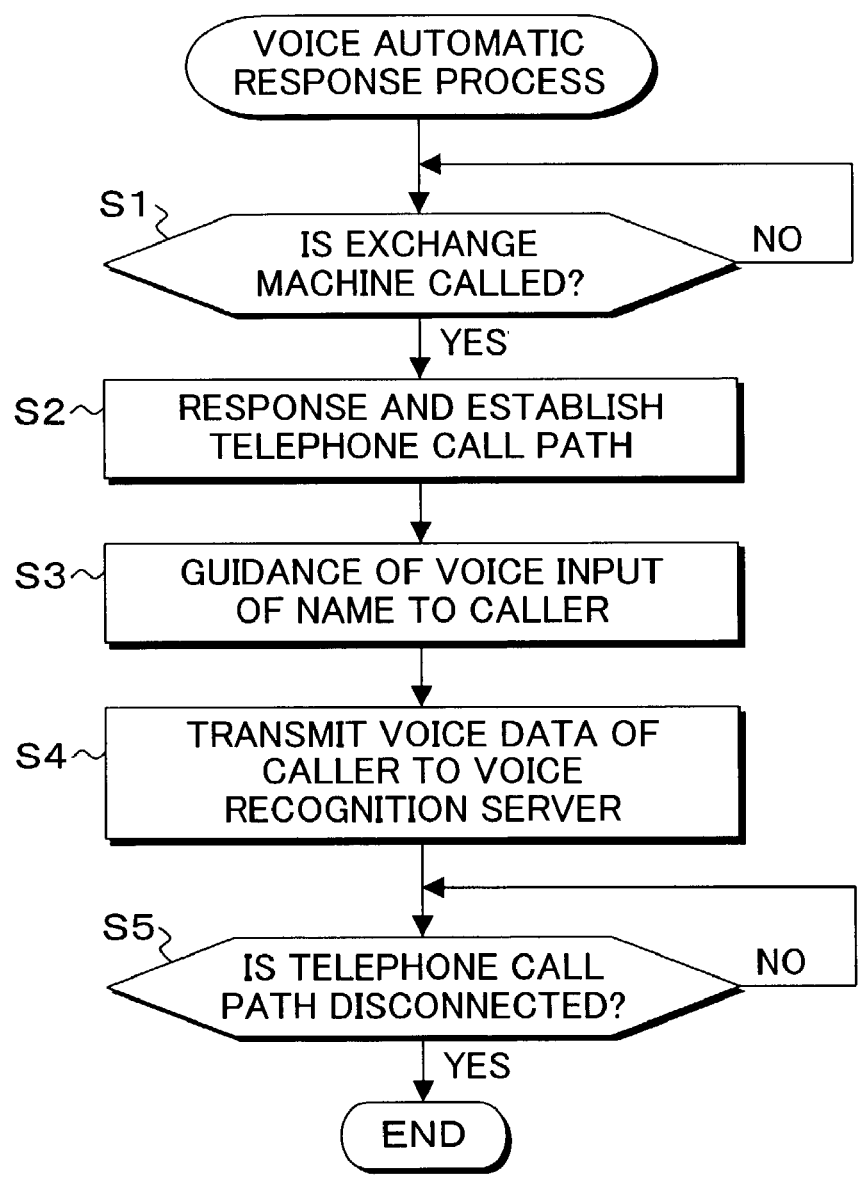

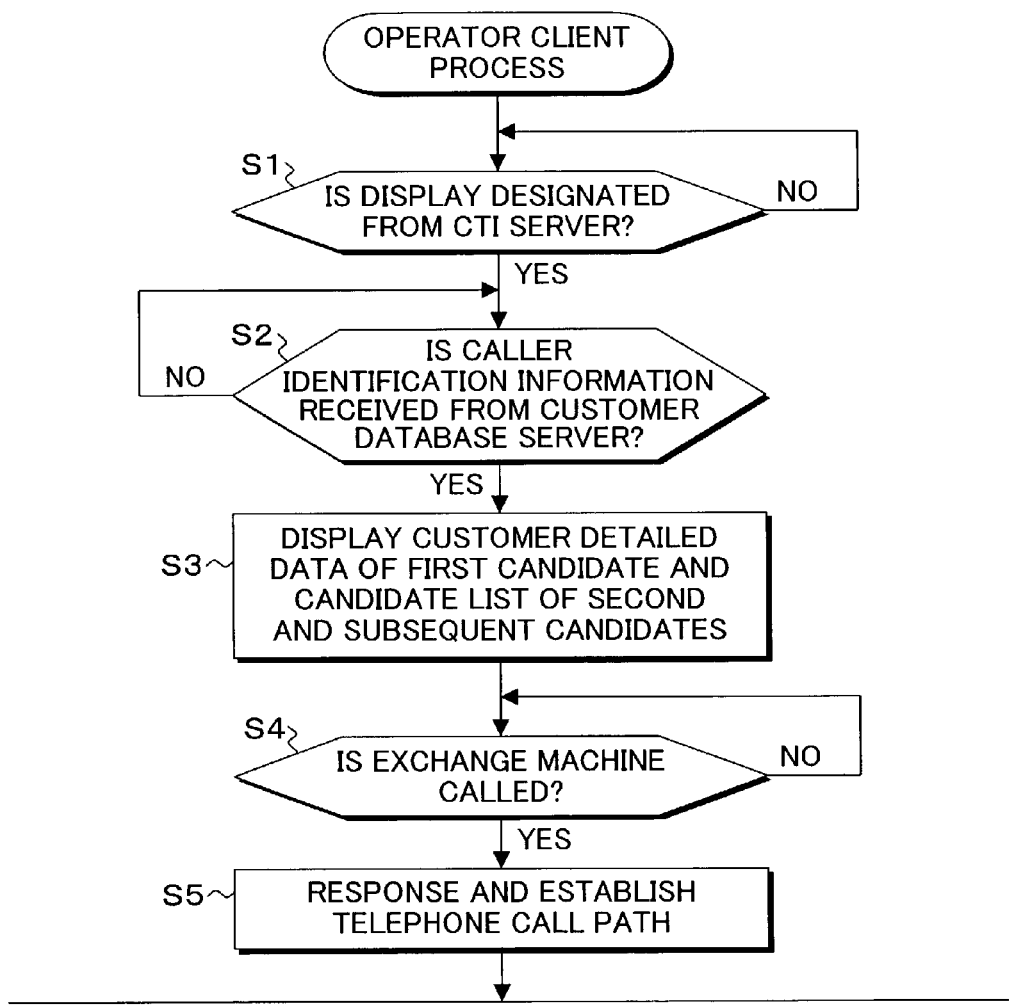

CALLER IDENTIFYING METHOD, PROGRAM, AND APPARATUS AND RECORDING MEDIUM

BACKGROUND OF THE INVENTION

1. Field of the Invention

The present invention relates to a caller identifying method, program, and apparatus and a recording medium which identify a caller before a call response to display customer information for an operator and a recording medium and, more particularly, to a caller identifying method, program, and apparatus and a recording medium which identify a caller by using voice recognition when a plurality of callers are registered to one caller number.

2. Description of the Related Arts

In a call receiving operation in a call center or the like, it is required for displaying customer information on a client screen of an operator before a call response that the operator identifies a caller as a specific person before the call response. A conventional method for identify a caller uses the telephone number of a caller noticed by the notification function of a caller number provided by a public telephone network. More specifically, customer information is registered in a customer database such that caller numbers are included in the customer information. The customer database is searched by a caller number received by an exchange machine to acquire customer information, and the customer information is displayed on a client screen of an operator.

However, when one telephone number is used by a plurality of persons, for example, when one telephone is used by family or when a telephone number noticed by an exchange machine of a company is a main switchboard, a caller may not be able to be identified by only a caller telephone number. In this case, the following method may be considered. That is, the voice data of the caller is acquired by a guidance performed by a voice automatic response device (IVR: Interactive Voice Response) to identify one of a plurality of callers registered to the same caller telephone number. However, at the present, the precision of the voice recognition is not necessarily high. Customer information which is not for a customer who actually calls is displayed to an operator, and the operator may not understood that the customer information is wrong until the operator deals with the customer. In such a case, a cumbersome operation which searches for correct customer information on the screen on which the wrong customer information to switch the screen to a new screen is required. For this reason, operators cannot smoothly deal with customers, and the services become poor.

SUMMARY OF THE INVENTION

According to the present invention, there is provided to a caller identifying method, program, and apparatus and a recording medium which can rapidly and easily cope with erroneous identification of a caller based on voice recognition to make it possible to switch the display to a display for correct caller information.

It is an object of the present invention to provide a caller identifying method for a system including: an exchange machine which can receive a caller number; a telephone coordination server (CTI server; Computer Telephony Integration) which coordinates with the exchange machine; a voice automatic response device (IVR device) which automatically responds with voice; a voice recognition device (voice recognition server) having a voice recognition function; a customer database in which customer information is registered and which is searched; and an operator client which is used to display a caller information for an operator.

As the caller specifying method, the present invention comprises:

the caller searching step of notifying a customer database of a caller number received from an exchange machine by a telephone coordination server to search for caller information;

the voice recognition step of, when pieces of caller information are acquired by the telephone coordination server in the searching operation of the customer database, connecting the exchange machine to a voice automatic response device to acquire predetermined voice data by telephone communication with the caller and comparing the voice data with voice data included in the caller information by a voice recognition device to cause the customer database to generate caller candidate information having priority levels; and the caller display step of displaying caller information of a first candidate on an operator client on the basis of the generated caller candidate information, displaying candidate names of second and subsequent candidates as a list, and causing an operation of selecting a candidate in the displayed list to change the caller information being displayed at the present into caller information of a selected candidate. According to the caller identifying method of the present invention, when a plurality of callers are registered to one telephone number, the first candidate discriminated by voice recognition is decided as a caller who calls, and his/her caller information is displayed to an operator. However, it is supposed that an error is caused by voice recognition, and a list of the second and subsequent candidates is also displayed at apart of the screen. For this reason, when the operator finds out the error of the caller information, the operator switches the display to the display of the caller information of a selected candidate by only a simple selection operation that clicks a correct candidate on the candidate list display. For this reason, the operator can rapidly and appropriately cope with the error of the caller by the voice recognition, and does not deteriorate the customer services.

In this case, the customer database registers at least customer names, caller numbers, voice data, and customer attribute data (customer discrimination data) are registered in units of customers. For this reason, on the basis of the customer database, the caller display step displays the customer name and the customer attribute data of the first candidate on the display screen, and displays a list of the customer names of the second and subsequent candidates in the order of the candidates at a part of the display screen. The voice recognition step performs a guidance of the same voice response as that of the voice data of the caller information to a caller by a voice automatic response device to acquire the voice data of the caller. More specifically, the customer database registers the voice pronouncing of a customer name as the voice data of a customer. For this reason, the voice recognition step performs a guidance of a voice input of the name of a caller by the voice automatic response device to acquire the pronouncing data of the caller name.

The present invention provides a program executed by a telephone coordination server in a system comprising: an exchange machine which can receive a caller number; a telephone coordination server which coordinates with the exchange machine; a voice automatic response device which automatically responds with voice; a voice recognition device having a voice recognition function; a customer database in which customer information is registered and which searches for the customer information; and an operator client which is used in voice response of an operator. More specifically, the program of the telephone coordination server causes a computer to execute:

the caller searching step of notifying a customer database of a caller number received from an exchange machine to search for caller information;

the voice recognition step of, when pieces of caller information are acquired in the searching operation of the customer database, connecting the exchange machine to a voice automatic response device to acquire predetermined voice data by telephone communication with a caller and comparing the voice data with voice data included in the caller information by a voice recognition device to cause the customer database to generate caller candidate information having priority levels; and the caller display step of displaying caller information of a first candidate on an operator client on the basis of the generated caller candidate information, displaying candidate names of second and subsequent candidates as a list, and causing an operation of selecting a candidate in the displayed list to change the caller information being displayed at the present into caller information of a selected candidate.

The present invention provides a telephone coordination server apparatus of a system including: an exchange machine which can receive a caller number; a voice automatic response device which automatically responds with voice; a voice recognition device having a voice recognition function; a customer database in which customer information is registered and which searches for the customer information; and an operator client which is used in voice response of an operator, comprising: a caller search designation unit which notifies a customer database of a caller number received from an exchange machine to search for caller information; a voice recognition designation unit which, when pieces of caller information are acquired in the searching operation of the customer database, connects the exchange machine to a voice automatic response device to acquire predetermined voice data by telephone communication with a caller and which compares the voice data with voice data included in the caller information by a voice recognition device to cause the customer database to generate caller candidate information having priority levels; and a caller display designation unit which displays caller information of a first candidate on an operator client on the basis of the generated caller candidate information, which displays candidate names of second and subsequent candidates as a list, and which causes an operation of selecting a candidate in the displayed list to change the caller information being displayed at the present into caller information of a selected candidate.

The present invention provides a computer readable recording medium in which a program executed by a telephone coordination server is stored in a system comprising: an exchange machine which can receive a caller number; a telephone coordination server which coordinates with the exchange machine; a voice automatic response device which automatically responds with voice; a voice recognition device having a voice recognition function; a customer database in which customer information is registered and which searches for the customer information; and an operator client which is used in voice response of an operator. This recording medium stores a program which causes a computer to execute:

the caller searching step of notifying a customer database of a caller number received from an exchange machine to search for caller information;

the voice recognition step of, when pieces of caller information are acquired in the searching operation of the customer database, connecting the exchange machine to a voice automatic response device to acquire predetermined voice data by telephone communication with a caller and comparing the voice data with voice data included in the caller information by a voice recognition device to generate caller candidate information having priority levels; and the caller display step of displaying caller information of a first candidate on an operator client on the basis of the generated caller candidate information, displaying candidate names of second and subsequent candidates as a list, and causing an operation of selecting a candidate in the displayed list to change the caller information being displayed at the present into caller information of a selected candidate. The details of the program, the server, and the recording medium according to the present invention are basically the same as those of the caller identifying method.

The above and other objects, features, and advantages of the present invention will become more apparent from the following detailed description with reference to the drawings.

DETAILED BRIEF DESCRIPTION OF THE DRAWINGS

FIGS. 3A and 3B are diagram for explaining the customer database in FIG. 1.

FIG. 4 is a diagram for explaining caller information searched from the customer database by a caller number.

FIG. 5 is a diagram for explaining caller identification information to which a priority level is added by voice recognition.

FIGS. 9A, 9B and 9C show a time chart of a caller identifying process according to the present invention in the embodiment in FIG. 1.

FIGS. 10A and 10B are flow chart of a procedure in a CTI server in FIG. 1.

FIG. 11 is a flow chart of a procedure in the exchange machine in FIG. 1.

FIGS. 12A and 12B show a flow chart of a procedure in the customer database server in FIG. 1.

FIG. 13 is a flow chart of a procedure in the voice automatic response device in FIG. 1.

FIGS. 15A and 15B show a flow chart of a procedure in the operator client in FIG. 1.

DESCRIPTION OF THE PREFERRED EMBODIMENT

Figure 1:
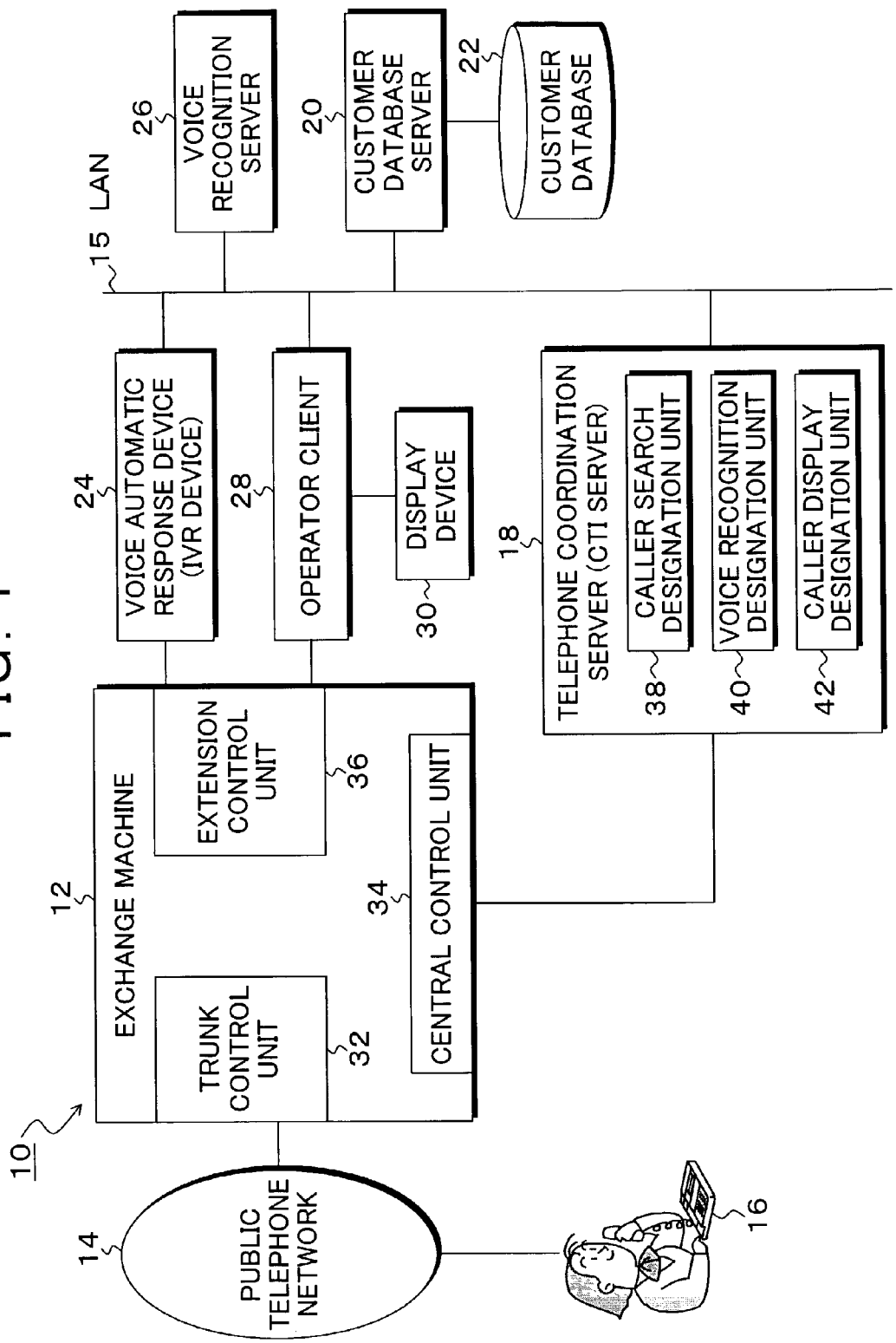
FIG. 1 is a block diagram of a system environment which is an embodiment of a caller identifying system according to the present invention.

FIG. 1 is a block diagram of a system environment showing an environment of a caller identifying system according to the present invention. A caller identifying system 10 according to the present invention is constituted by an exchange machine 12, a telephone coordination server 18 which is known as a CTI server, a customer database server 20 having a customer database 22, a voice automatic response device 24 which is known as an IVR device, a voice recognition server 26, and an operator client 28 having a display device 30. The exchange machine 12 performs telephone call connection of a caller telephone set 16 through a public telephone network 14. In the exchange machine 12, a trunk control unit 32, a central control unit 34, and an extension control unit 36 are arranged. When the trunk control unit 32 of the exchange machine 12 detects incoming of a call from the caller telephone set 16 to acquire caller number information, the trunk control unit 32 give the caller number information to the central control unit 34. The central control unit 34 notifies the telephone coordination server 18 of information including an incoming trunk number and an incoming caller number. In the telephone coordination server 18, the process functions of a caller search designation unit 38, a voice recognition designation unit 40 and a caller display designation unit 42 are arranged. The caller search designation unit 38 notifies the customer database server 20 connected through a LAN 15 of the caller number noticed by the exchange machine 12, and the caller search designation unit 38 responds such that the information of callers registered in the customer database 22 is used as caller searching information. When the caller searching information received from the customer database server 20 is information of a plurality of callers, the voice recognition designation unit 40 of the telephone coordination server 18 designates the exchange machine 12 to be connected to the voice automatic response device 24 and, at the same time, notifies the voice automatic response device 24 of the caller searching information including the plurality of callers. The voice recognition designation unit 40 acquires the voice information of the caller, causes the voice recognition server 26 to perform voice recognition of the voice data, and causes the exchange machine 12 to acquire caller identification information having a priority level based on the voice recognition result from the customer database server 20. The exchange machine 12 which is designated by the voice recognition designation unit 40 of the telephone coordination server 18 to be connected to the voice automatic response device 24 makes a call to the voice automatic response device 24 from the extension control unit 36. In response to this call, the voice automatic response device 24 performs an incoming operation to establish a telephone call path to the caller telephone set 16 through the exchange machine 12 and the public telephone network 14. When the telephone call path is established, the voice automatic response device 24 outputs a voice guidance to the caller to urge the caller to input the name of the caller with voice. In this manner, the voice automatic response device 24 acquires the voice data of the caller, and the input voice data is supplied to the voice recognition server 26 through the voice automatic response device 24. The voice recognition server 26 performs voice recognition of registered voice data of a plurality of callers in caller searching information received through the voice automatic response device 24 by designation of the telephone coordination server 18 and voice data obtained from a speaking caller by the guidance of the voice automatic response device 24, compares degrees of similarity between the input voice data and the registered voice data with each other, generates a voice recognition results to which priority levels are given in proportion to the degrees of similarity, and notifies the customer database server 20 of the voice recognition results. When the customer database server 20 receives the voice recognition results having the priority levels from the voice recognition server 26, the customer database server 20 generates pieces of caller identification information to which priority levels are given according to the voice recognition results to supply the pieces of caller identification information to the telephone coordination server 18. The caller display designation unit 42 of the telephone coordination server 18 responds to voice recognition designation to the voice automatic response device 24, and then receives the pieces of caller identification information having the priority levels based on the voice recognition results from the customer database server 20. In this case, the caller display designation unit 42 designates the exchange machine 12 to the operator client 28 of an extension number to the voice automatic response device 24, and designates the customer database server 20 to transfer customer detailed data according to the caller identification information. By designation from the caller display designation unit 42 in the telephone coordination server 18, the operator client 28 receives a call from the extension control unit 36 of the exchange machine 12, and a telephone call path with the caller telephone set 16 is established by an incoming operation. At the same time, the operator client 28 displays customer detailed data related to the first candidate having the highest priority level on the customer information display screen of the display device 30 on the basis of the caller identification information transferred from the customer database server 20. The operator client 28 also displays a list of the customer names of the second and subsequent candidates in number order at a part of the customer information display screen of the display device 30. In this manner, when the operator who uses the operator client 28 performs telephone communication with the caller by incoming to a call from the exchange machine 12, the operator can perform necessary response to the caller while watching the customer detailed data of the first candidate displayed on the display device 30. At this time, when the operator finds that the caller is different from the first candidate displayed on the display device 30 in the telephone communication with the caller, the operator recognizes a correct caller by checking the name of the caller because the list of the second and subsequent candidates is displayed on the display screen. The operator selects the corresponding caller from the displayed list of the second and subsequent candidates on the display screen by clicking the corresponding caller. When the caller is selected from the second and subsequent candidates, the operator client 28 requires the customer detailed data from the customer database server 20, and customer detailed data is acquired from the customer database 22. The customer detailed data of the first candidate erroneously displayed on the display device 30 is switched to the customer detailed data of a correct caller selected by the operator, and the operator can appropriately respond to the caller.

Figure 2:
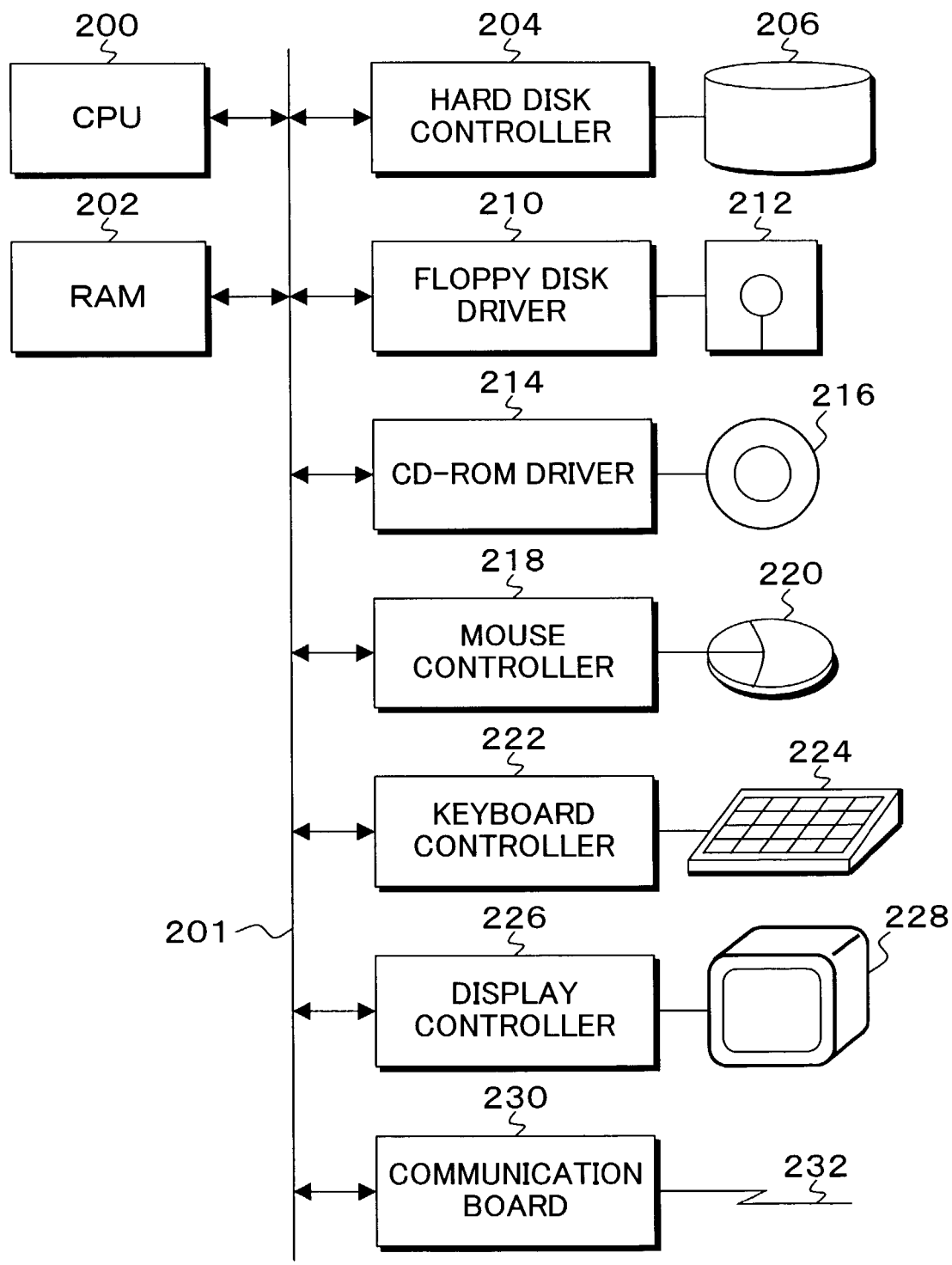
FIG. 2 is a diagram for explaining hardware resources of a computer applied to the server or the client in FIG. 1.

The telephone coordination server 18, the customer database server 20, the voice automatic response device 24, the voice recognition server 26, and the operator client 28 are realized by, e.g., hardware resources of the computer shown in FIG. 2. In this computer, to a bus 201 of a CPU 200, a RAM 202, a hard disk driver (software) 204, a floppy disk driver (software) 210, a CD-ROM driver (software) 214, a mouse controller 218, a keyboard controller 222, a display controller 226, and a communication board 230 are connected. A hard disk drive 206 is connected to the hard disk controller 204. When the telephone coordination server 18 is used for example, an application program for executing the caller identification process according to the present invention is loaded on the telephone coordination server 18. When the computer is started, a required program is called from the hard disk drive 206, developed on the RAM 202, and executed by the CPU 200. A floppy disk drive (hardware) 212 is connected to a floppy disk driver 210, so that data can be written in a floppy disk (R). A CD drive (hardware) 216 is connected to the CD-ROM driver 214, so that data or a program stored in a CD can be loaded. The mouse controller 218 transmits an input operation of a mouse 220 to the CPU 200. The keyboard controller 222 transmits an input operation of a keyboard 224 to the CPU 200. The display controller 226 causes a display unit 228 to display data. The communication board 230 uses a communication circuit 232 including a wireless communication system to communicate with another computer or portable terminal.

FIGS. 3A and 3B are diagrams for explaining a customer database table 44 and a voice database table 46 stored in the customer database 22 arranged in the customer database server 20 in FIG. 1. FIG. 3A shows a customer database table 44 in which a customer number 48, a name 50, and discrimination data (customer attribute data) 52 are registered as one record every customer. In this case, the discrimination data 52 is data used in the display of customer detailed data in the display device 30 of the operator client 28 in FIG. 2, and includes an address, a sex, an age, a hobby, a transaction history, and the like. FIG. 3B shows a voice database table 46 in which a caller number 54, voice data 56, and a customer number 58 are registered as one record every customer. In this voice database table 46, for example, since a caller number "044-777-1111" is a main switchboard, a plurality of customers are registered to the caller number.

When the telephone coordination server 18 in FIG. 2 receives the notice of a caller number from the exchange machine 12, the telephone coordination server 18 refers to the voice database table 46 in FIG. 3B in a searching operation of the customer database 22 by the caller number. For example, it is assumed a caller number noticed from the exchange machine 12 is "044-777-1111". In this case, for example, caller searching information 60 shown in FIG. 4 can be acquired by searching the voice database table 46. In the caller searching information 60, voice data 64 and customer numbers 66 of three customers having the same caller number 62 are searched as a searching result. As shown in FIG. 4, the caller searching information 60 acquired by a searching operation using a caller number of the customer database 22 is noticed to the voice automatic response device 24 under the designation of the telephone coordination server 18. The voice automatic response device 24 urges the caller to utter a voice, e.g., to utter the name of the caller by guidance performed by a telephone call path established with the caller telephone set 16 on the basis of designation from the telephone coordination server 18 to the exchange machine 12, and the received voice data is transmitted to the voice recognition server 26 together with the caller searching information 60. The degrees of similarity between the received voice data and the caller the voice data 64 of the customers stored in the caller searching information 60 are compared with each other by voice recognition. By the comparing process of the voice recognition by the voice recognition server 26, the degrees of similarity between the received voice data and the voice data of the customers are calculated, and voice recognition results having priority levels which are in proportion to the degrees of similarity are obtained. In this case, according to the recognition results of the voice data 64 in the caller searching information 60, it is assumed that "FUJITSU TARO", "FUJITSU JIRO", and "FUJI TARO" have the first priority level, the second priority level, and the third priority level, respectively. In this case, on the basis of the voice recognition results having the priority levels, caller identification information 68 as shown in FIG. 5 is generated by the customer database server 20. As the caller identification information 68, one record is constituted by a priority level 70, a name 72, and a customer number 74. The record of the first priority level is the first candidate, the record of the second priority level is the second candidate, and the record of the third priority level is the third candidate. After the caller identification information 68 is noticed from the customer database server 20 in FIG. 1 to the telephone coordination server 18, simultaneously with designation of connection switching of an extension to the operator client 28 of the exchange machine 12 by the telephone coordination server 18, the caller identification information 68 is noticed from the customer database server 20 to the operator client 28 by designation of the telephone coordination server 18. At this time, with reference to the caller identification information 68 and the customer database table 44 in FIG. 3 by "aaaa" which is customer number 74 of the first candidate having the first priority level in the caller identification information 68, one record having the name 50 and the discrimination data 52 corresponding to "aaaa" of customer number 48 is read and transferred to the operator client 28.

Figure 6:
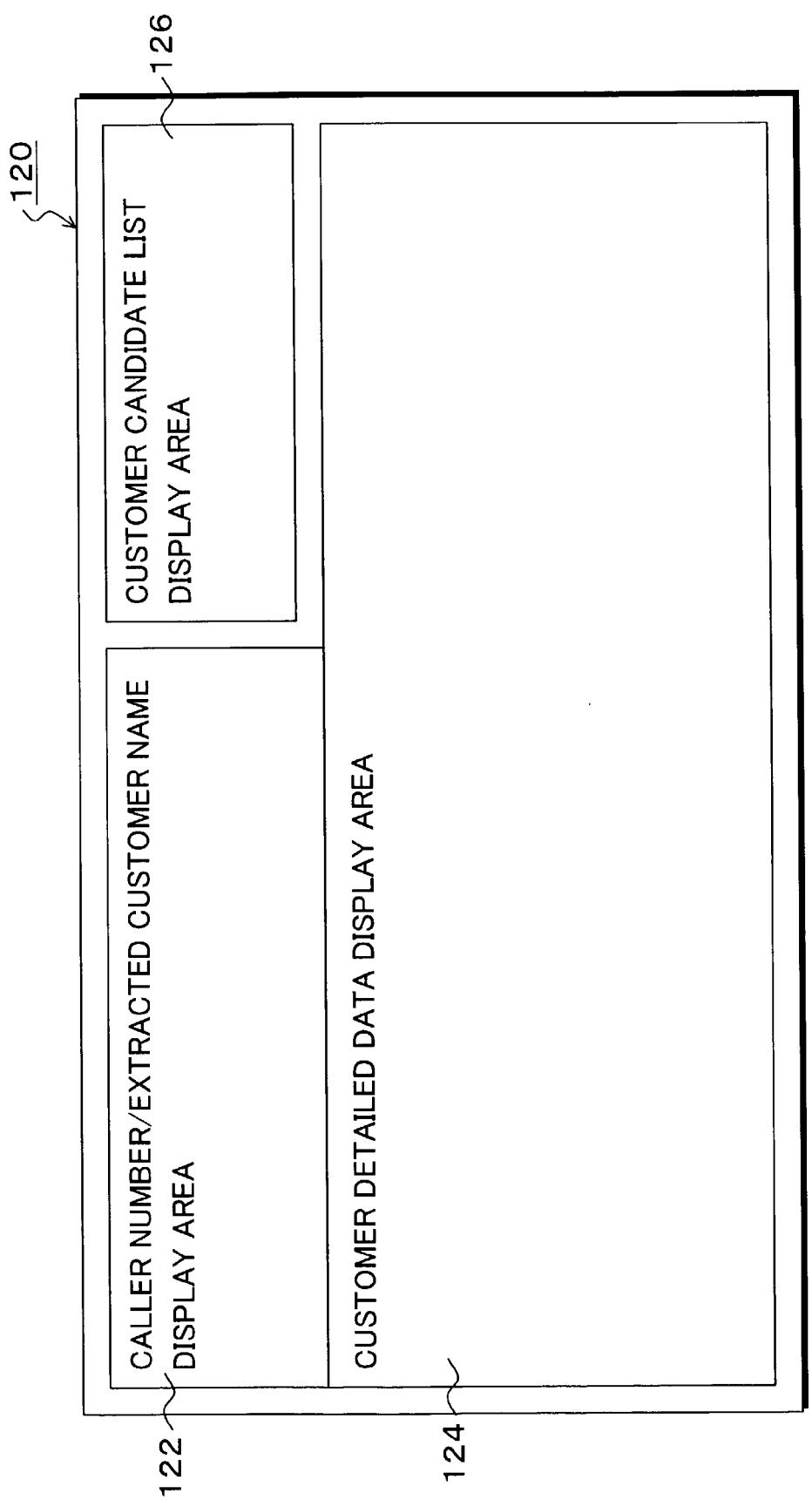
FIG. 6 is a diagram for explaining the layout of a customer information display screen in the operator client in FIG. 1.

FIG. 6 is a diagram for explaining the layout of a customer information display screen on the display device 30 arranged in the operator client 28 in FIG. 1. In a customer information display screen 120, a caller number/extracted customer name display area 122 is arranged at an upper left side, and a customer detailed data display area 124 is arranged under the caller number/extracted customer name display area 122. In addition, a customer candidate list display area 126 is arranged at the upper right corner.

Figure 7:
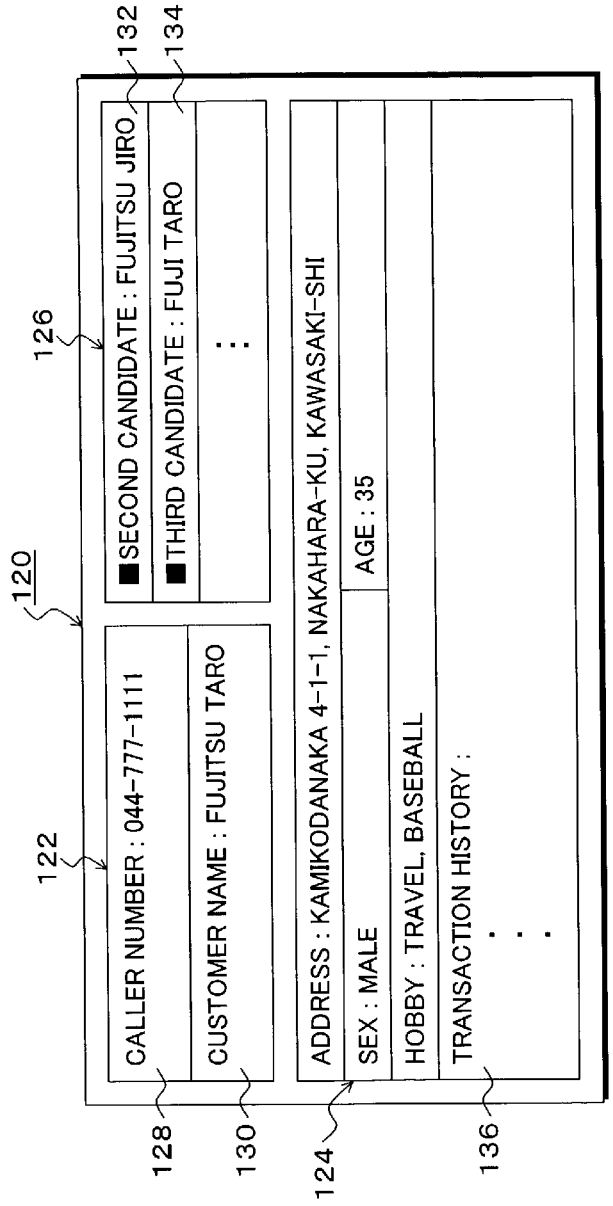
FIG. 7 is a diagram for explaining a customer information display screen on which the caller identification information in FIG. 5 is displayed.

FIG. 7 shows display contents of the customer information display screen 120 in the operator client 28 on the basis of the caller identification information 68 shown in FIG. 5. In the caller number/extracted customer name display area 122 of the customer information display screen 120, "044-777-1111" is displayed as a caller number 128, and "FUJITSU TARO" which is the first candidate having the first priority level is displayed as a customer name 130. In the customer detailed data display area 124 arranged under the caller number/extracted customer name display area 122, first candidate detailed data 136 based on the discrimination data obtained from the customer database table 44 in FIG. 3A is displayed according to the customer number "aaaa" of the first candidate. In this example, the address, sex, age, hobby, and transaction history of the first candidate are displayed.

When the customer detailed data of the first candidates is displayed on the recognition result of the voice data in FIG. 7, a telephone call path is established between the operator client 28 and the caller telephone set by an extension call from the exchange machine. For this reason, the operator can perform necessary response to the customer of the identified first candidate while watching the customer information display screen 120. However, when the operator begins to respond to the caller, it is assumed that the operator finds that the caller is different from the customer name "FUJITSU TARO" displayed as the first candidate. For example, when the operator responds to the caller to say that "Are you Mr. Fujitsu Taro? Thank you for your patronage.", the caller makes an answer that "I am not Mr. Fujitsu Taro. I am Fuji Taro.", The operator recognizes that the caller is the third candidate displayed in the customer candidate list display area 126, and performs a selection operation to click the third candidate by a mouse operation. When the selection operation of the third candidate is performed, the operator client 28 in FIG. 1 requests the customer database server 20 to transfer customer data according to the customer number "dddd" of the third candidate, and the customer data of the customer number "dddd" is read from the customer database table in FIG. 3A and transferred. In this manner, as in the customer information display screen 120 in FIG. 8, the customer name is set as "FUJI TARO" which is the customer name of the third candidate, and third candidate detailed data 138 acquired from the customer database is displayed in the customer detailed data display area 124. In this manner, when the contents of the wrong customer information display screen are displayed by the recognition result of the voice data, the wrong customer information display screen can be switched to a correct customer information display screen by a simple operation which selects a corresponding candidate from the second and subsequent candidates when the operator founds the wrong customer information display screen. Even if a customer is erroneously identified on the basis of voice data, the operator can easily and rapidly acquire current customer information to respond to the caller.

FIGS. 9A, 9B and 9C show a time chart of a caller identifying process performed when a plurality of callers are searched by a caller number in the caller identifying system 10 in FIG. 1. In FIGS. 9A, 9B and 9C, for descriptive convenience, a CTI server is used as the telephone coordination server 18, and an IVR device is used as the voice automatic response device 24. First, a caller performs an outgoing operation as a process 76 to the exchange machine 12 with dial by using the caller telephone set 16, the outgoing information is received by the exchange machine 12 through the public telephone network 14 as in a process 78 to transmit the caller number to the exchange machine 12. The exchange machine 12 acquires the caller number by the incoming operation for a call from the caller telephone set 16, and notifies the telephone coordination server 18 of the acquired caller number as in a process 80. The telephone coordination server 18 which receives the notice of the caller number, as in a process 82, notifies the customer database server 20 of the caller number to designate a searching process. The customer database server 20 searches the voice database table 46 as shown in FIG. 3B by the noticed caller number, and returns a response representing that a plurality of callers are objects to the telephone coordination server 18 by the caller searching information 60 as in a process 84. When the telephone coordination server 18 receives the caller searching information including the information representing that a plurality of callers are objects, the telephone coordination server 18 designates the exchange machine 12 to perform an incoming process to the voice automatic response device 24 as in a process 86, and performs notification of the caller number to the voice automatic response device 24 by the caller searching information acquired from the customer database server 20 as in a process 88. In this notification of the caller number, the caller searching information 60 as shown in FIG. 4 is noticed. For this reason, in addition to the caller number, voice data and a customer number are noticed to the voice automatic response device 24. The exchange machine 12 makes an incoming call of an extension to the voice automatic response device 24 by a process 90, and receives an incoming response of a process 92 to perform telephone call path establishment 94 between the caller telephone set 16 and the voice automatic response device 24. When the telephone call path is established, the voice automatic response device 24 designates the caller to utter a voice by a guidance as in a process 96, e.g., to utter the name of the caller. In response to this, when the caller utters the name in the guidance as in a process 98, the voice data is received by the voice automatic response device 24 and transmitted to the voice recognition server 26 as an utterance information notice as in a process 100. At the same time, the caller searching information 60 as shown in FIG. 4 is noticed from the voice automatic response device 24 to the voice recognition server 26. The voice recognition server 26 performs a comparison process by voice recognition with respect to voice data obtained by utterance of the caller and the respective voice data of the plurality of callers included in the caller searching information 60, and notifies the customer database server 20 of recognition results to which priority levels are given according to the degrees of similarity as in a process 102. The customer database server 20 which receives the notice of the voice recognition results including the priority levels from the voice recognition server 26 identifies a caller such as the first candidate, the second candidate, or the third candidate according to the priority levels in a process 104, generate the caller identification information 68 as shown in FIG. 5, and notifies the telephone coordination server 18 of the extension number of the voice automatic response device 24 and the caller information in a process 106. The telephone coordination server 18 designates the exchange machine 12 to transfer the information to the operator client 28 by a process 108. Subsequently, as in a process 110, the telephone coordination server 18 designates a destination of the caller information such that the caller identification information 68 is transferred to the customer database server 20 as shown in FIG. 5. In response to this, the customer database server 20 transmits the caller information to the operator client 28 as in a process 112. As this caller information, the customer data of the customer database table 44 in FIG. 3A related to the first candidate having the first priority level is transmitted to the caller identification information 68 in FIG. 5. Subsequently, as in a process 114, the exchange machine 12 makes an incoming call to the operator client 28. In response to this, as in a process 116, when the operator client 28 responds to the exchange machine 12, telephone call path establishment 118 is performed between the caller telephone set 16 and the operator client 28, and the operator can appropriately respond to the caller while watching the customer data on the process 120 as shown in FIG. 7. As a matter of course, when the operator finds that the display of the first candidate is wrong in communication with the caller, the operator selects a correct candidate to switch the contents of the wrong customer display screen to the contents of the customer display screen of the selected correct candidate. If the voice recognition result includes an error, the operator can switch the wrong customer display to the correct customer display without any problem to appropriately respond to the caller.

Figure 10B:
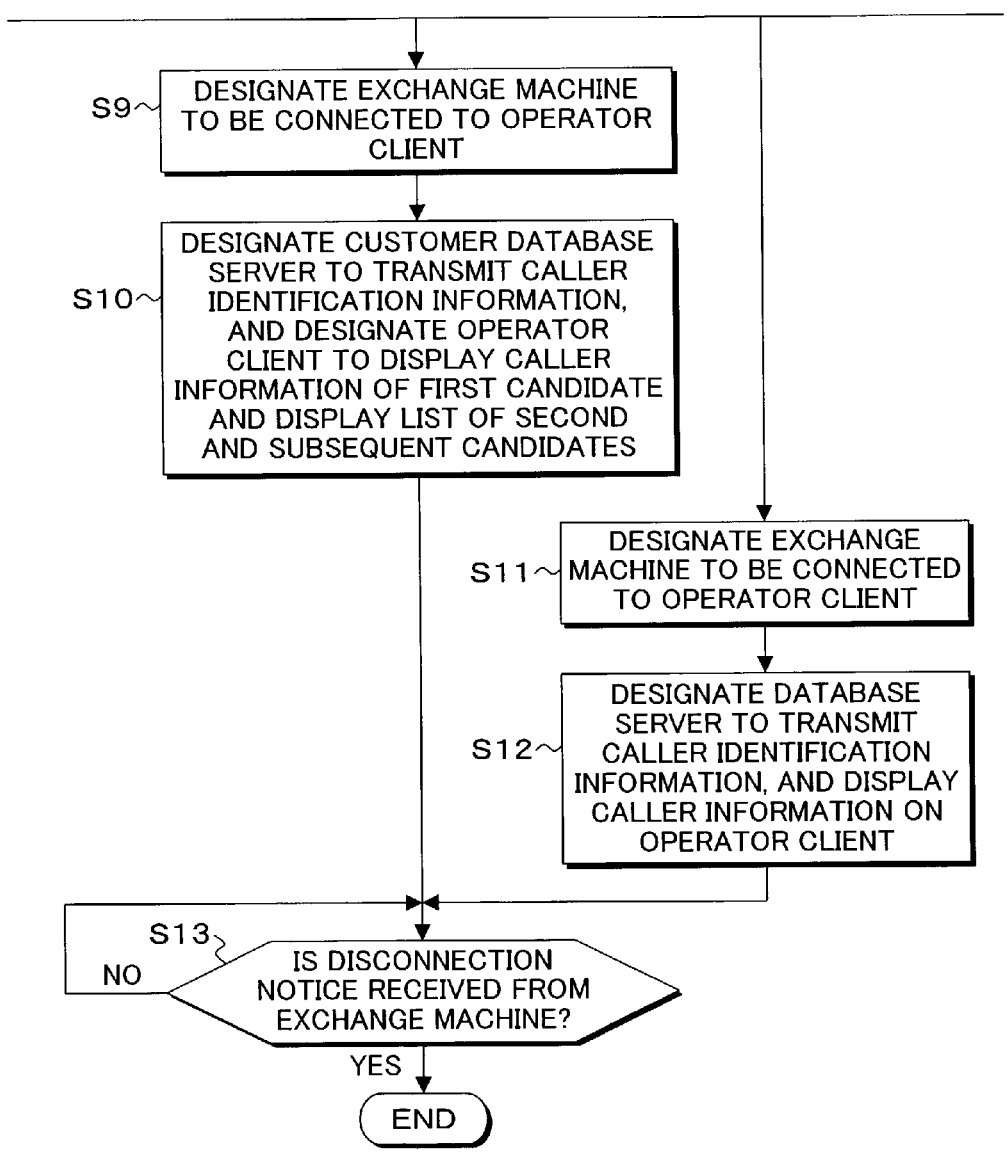

FIGS. 10A and 10B show a flow chart of server processes of the telephone coordination server 18 in FIG. 1. This flow chart shows the procedure of a program installed in the telephone coordination server 18 and executed by the telephone coordination server 18. In the following flow chart, a telephone coordination server is expressed by a CTI server, and a voice automatic response device is expressed by an IVR device. When a caller number is received from the exchange machine 12 in step S1, a request for searching for a caller by the notice of the caller number is performed to the customer database server 20 in step S2. In this manner, the caller searching information 60 including a plurality of callers as shown in FIG. 4 searched by the caller number noticed by the customer database server 20 is acquired in step S3. Subsequently, it is checked in step S4 whether a plurality of callers exist or not. When the plurality of callers exist, the control flow shifts to the process in step S5. After the telephone coordination server 18 designates the exchange machine 12 to be connected to the voice automatic response device 24 in step S5, the telephone coordination server 18 transmits the caller searching information to the voice automatic response device 24 to designate a process in step S6. In addition, in step S7, the telephone coordination server 18 designates the voice recognition server 26 to perform a recognition process of voice data. In an actual device, the designation to the voice recognition server 26 in step S7 need not be directly performed, the telephone coordination server 18 may perform only state monitoring of the voice recognition server 26. As a matter of course, as in steps S6 and S7, the telephone coordination server 18 may designates both the voice automatic response device 24 and the voice recognition server 26 to perform the processes. By the designations to the voice automatic response device 24 and the voice recognition server 26, voice data obtained by utterance of the caller is acquired, and voice recognition results having priority levels are generated by comparing the voice data with the voice data of the plurality of callers in voice recognition and extracted to the customer database server 20. The telephone coordination server 18 acquires the caller identification information 68 having the priority levels as shown in FIG. 5 from the customer database server 20 in step S8. After the telephone coordination server 18 designates the exchange machine 12 to be connected to the operator client 28 in step S9, and the telephone coordination server 18 designates the customer database server 20 to transmit the caller identification information having the priority levels to the operator client 28. In this manner, a display of caller information of the first candidate of the caller identification information and a display of a list of the second and subsequent candidates are performed in the operator client 28 as shown in FIG. 7.

On the other hand, when a single caller is identified by the caller searching information obtained from the customer database server 20 in step S4, the control flow shifts to step S11, and the telephone coordination server 18 designates the exchange machine 12 to be connected to the operator client 28 and then designates the customer database server 20 to transmit the caller identification information in step S12. In this manner, the information of the identified caller is displayed on the display device 30 of the operator client 28. In this case, although the customer information display screen is almost the same as that in FIG. 7, both the screens are different from each other in only that candidates are not displayed in the customer candidate list display area 126 at the upper right corner of the screen. When the telephone coordination server 18 receives a notice of disconnection from the exchange machine 12 in step S13, the series of processes are ended.

FIG. 11 is a flow chart of a procedure of the exchange machine 12 in the caller identifying system 10 in FIG. 1. When the exchange machine 12 receives an incoming call from the caller telephone set 16 in step S1, the exchange machine 12 notifies the telephone coordination server 18 of a trunk number and a caller number in step S2. When the telephone coordination server 18 designates the exchange machine 12 to be connected to the voice automatic response device 24 in step S3, the exchange machine 12 is connected to the voice automatic response device 24 by an incoming call generated by the extension control unit 36 in step S4, and a telephone call path is established between the voice automatic response device 24 and the caller telephone set 16 is established. In addition, when the telephone coordination server 18 designates the exchange machine 12 to be connected to the operator client 28 in step S5, the exchange machine 12 is disconnected from the voice automatic response device 24 by the extension control unit 36 to make an incoming call to the operator client 28. The exchange machine 12 is connected to the operator client 28 in step S6 to establish a telephone call path between the operator client 28 and the caller telephone set 16. In addition, disconnection of the telephone call path is designated in step S7, a notice of disconnection is transmitted to the telephone coordination server 18 in step S8. In response to this, the series of processes to the incoming calls are reset.

Figure 12B:
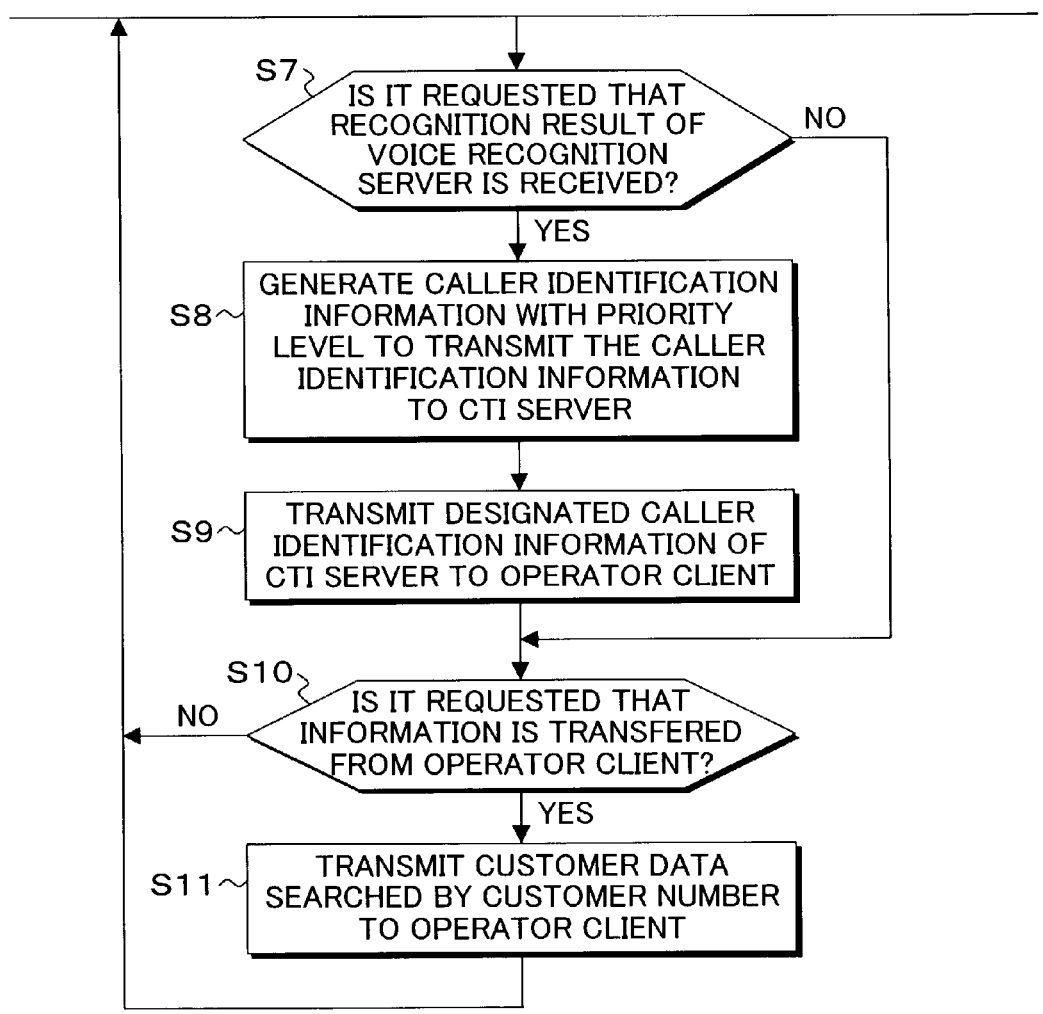

FIGS. 12A and 12B show a flowchart of processes of the customer database server 20 in the caller identifying system 10 in FIG. 1. In FIG. 12A, a customer registration process is performed in step S1. This customer registration process is performed prior to a caller identifying process according to the present invention. In the customer registration process, customer information obtained in on-line or off-line by an application of a customer is registered in the customer database table 44 in FIG. 3A. In addition, the voice database table 46 as shown in FIG. 3B is prepared. With respect to the voice data 56 in the voice database table 46, the telephone coordination server 18 notifies the exchange machine 12 of a caller number and performs a caller process to the customer to establish a telephone call path. In this state, the telephone coordination server 18 designates the voice automatic response device 24 to perform a registration process of the voice data, designates the customer to utter, e.g., the customer name through a guidance, and registers the input voice data in the voice database table 46. Upon completion of the customer registration process in step S1, a database process required for the caller identifying process according to the present invention is performed. When the customer database server 20 received from a request for searching by a caller number from the telephone coordination server 18 in step S2, the customer database server 20 performs a searching process by the caller number to the voice database table 46 in FIG. 3B in step S3. For example, the caller searching information 60 as shown in FIG. 4 is transmitted to the telephone coordination server 18 in step S4. Subsequently, the customer database server 20 receives a request for transferring caller searching information which designates the voice automatic response device 24 from the telephone coordination server 18 in step S5, the customer database server 20 transfers the caller searching information to the voice automatic response device 24 in step S6. When the customer database server 20 receives voice recognition results having priority levels from the voice recognition server 26 in step S7, the customer database server 20 generates the caller identification information 68 having the priority levels as shown in FIG. 5 to transmit the caller identification information 68 to the telephone coordination server 18 in step S8. By a designation from the telephone coordination server 18, the customer database server 20 transmits the caller identification information having the priority levels to the operator client 28. Furthermore, for a request for transferring information made by designating the customer number from the operator client in step S10 when an operation of selecting one of the second and subsequent candidates when the operator finds a wrong voice recognition result by a display state of the customer data of the first candidate in the operator client as shown in FIG. 7, in step S11, customer data searched by the noticed customer number is transmitted to the operator client.

FIG. 13 is a flow chart of a voice automatic response process in the voice automatic response device 24 in FIG. 1. When an extension call is made by the exchange machine 12 in step S1, the voice automatic response device 24 performs incoming response to the call to establish a telephone call path between the voice automatic response device 24 and the caller telephone set 16 in step S2. Subsequently, a guidance which inputs, e.g., a name with a voice is performed to the caller in step S3. In this manner, when the caller utters the name, the voice data of the caller is transmitted to the voice recognition server 26 in step S4. When disconnection of the telephone call path by connection switching to the operator client 28 is decided in step S5, the voice automatic response device 24 ends the process, and is prepared for the next process.

Figure 14:
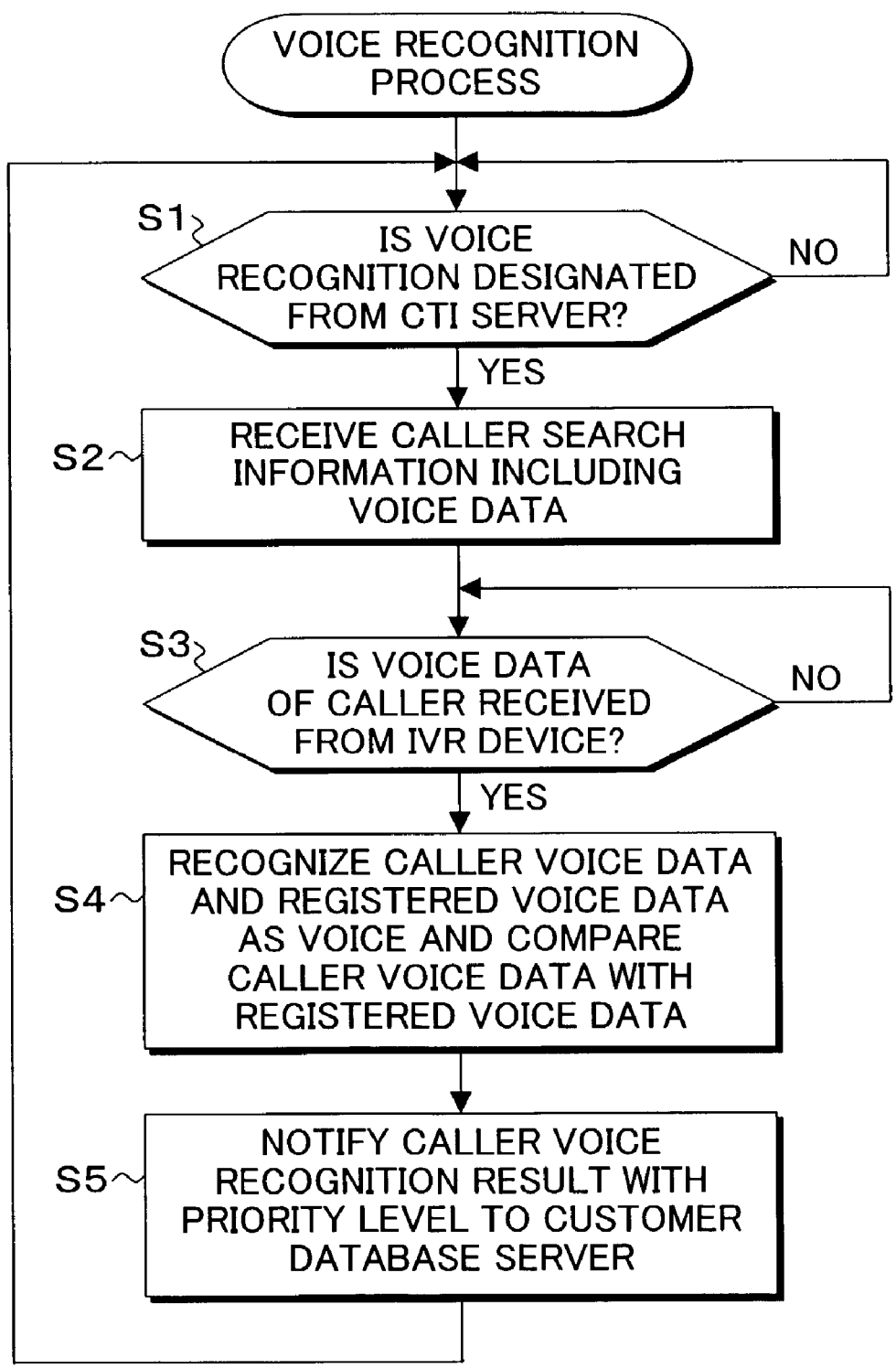
FIG. 14 is a flow chart of a procedure in the voice recognition device in FIG. 1.

FIG. 14 is a flow chart of a voice recognition process performed by the voice recognition server 26 in the caller identifying system 10 in FIG. 1. When the voice recognition server 26 receives a voice recognition designation from the telephone coordination server in step S1, in fact, receives a designation through the voice automatic response device 24, the voice recognition server 26 receives the caller searching information 60 including voice data as shown in FIG. 4 in step S2. When the voice recognition server 26 receives voice data obtained by utterance of a caller for a guidance from the voice automatic response device 24 in step S3, the voice recognition server 26 compares the voice data of the caller with the registered voice data by voice recognition in step S4 to calculate, e.g., the degrees of similarity. The voice recognition results of the caller to which priority levels are given in proportion to the degrees of similarity are noticed to the customer database server 20 in step S5, and the series of processes are ended.

Figure 8:
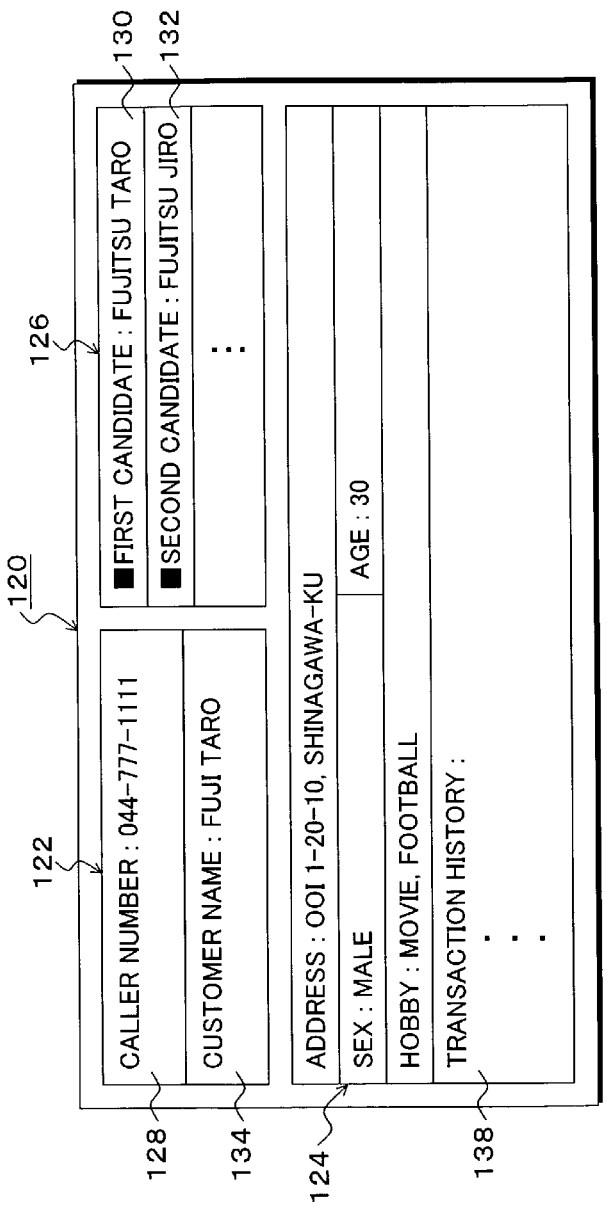
FIG. 8 is a diagram for explaining a customer information display screen obtained when a third candidate is selected as a caller in FIG. 7.
Figure 15B:
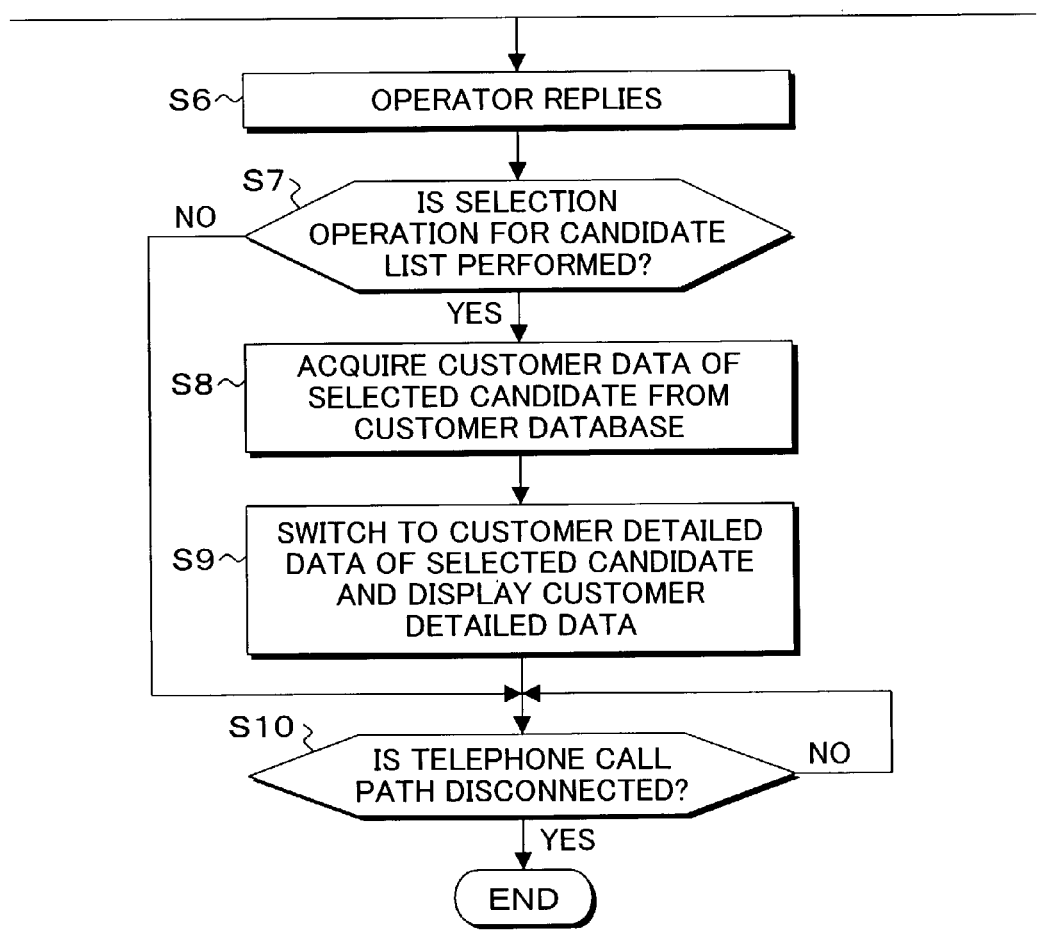

FIGS. 15A and 15B are a flow chart of processes of the operator client 28 in the caller identifying system 10 in FIG. 1. When the operator client 28 receives a designation for displaying customer information from the telephone coordination server 18 in step S1, the operator client 28 waits for reception of caller identification information from the customer database server 20. When the operator client 28 receives the caller identification information, the operator client 28 displays the customer detailed data of the first candidate and a customer list of the second and subsequent candidates on the process 120 as in FIG. 7 in step S3. The display designation from the telephone coordination server 18 in step S1 is not directly performed, and the display designation is directly performed through the customer database server 20. More specifically, an indirect designation of the telephone coordination server 18 to the operator client 28 is a designation for transferring the caller identification information to the operator client 28 to the customer database server 20. When the customer information is displayed in step S3, the operator client 28 decides an extension call from the exchange machine 12 in step S4. When the operator client 28 responds to the extension call, the operator client 28 establishes a telephone call path between the operator client 28 and the caller telephone set 16 in step S5. In this manner, the operator performs a required response in step S6. In the response of the operator, when the operator performs an operation for selecting one of the second and subsequent candidates because the operator finds that the display of the first candidate is wrong, the selection operation of the candidate list is decided in step S7. The operator client 28 acquires customer data of the selected candidate from the customer database server 20 in step S8, and the operator client 28 switches the wrong data to the customer detailed data of the selected candidate as shown in FIG. 8 to display the customer detailed data. When the caller telephone set 16 is disconnected from the operator client 28 upon completion of the response by the operator, the disconnection of the telephone call path in step S10 is decided, and the process is ended.

An embodiment of a computer readable recording medium in which a program of a caller identifying process according to the present invention is stored will be described below. The program of the caller identifying process according to the present invention can be divided into a program of the telephone coordination server 18 according to the flow chart in FIGS. 10A and 10B, a program of the exchange machine 12 according to the flow chart in FIG. 11, a program of the customer database server 20 according to the flow chart in FIGS. 12A and 12B, a program of the voice automatic response device 24 according to the flow chart in FIG. 13, a program of the voice recognition server 26 according to the flow chart in FIG. 14, and a program of the operator client 28 according to the flow chart in FIGS. 15A and 15B. Of these programs, the program of the telephone coordination server 18 which controls the entire operation of the system is a main program in the present invention. The programs required for identifying a caller according to the present invention are stored in a mobile storage medium such as a CD-ROM, a floppy disk (R), a DVD disk, a magnetooptical disk, a modem, a database connected by using a LAN interface through a line, or a database of another computer system PC. The programs are installed in a computer and then executed. In addition, recording media include a recording medium, a mobile storage medium such as a CD-ROM, a floppy disk (R), a DVD disk, a magnetooptical disk, or an IC card, a storage device such as a hard disk drive (HDD) arranged inside or outside a computer system, a database which holds the programs through a line, another computer system PC, a database thereof, and a transmission medium on a line.

As described above, according to the present invention, when a plurality of customers, i.e., callers are registered to one telephone number, the customer information of the first candidate discriminated by voice recognition is displayed as the information of the caller to an operator. However, an error caused by the voice recognition is supposed, and a list of the second and subsequent candidates is displayed at a part of the screen. When the operator finds that the displayed caller is wrong, the operator performs only such a simple selection operation that a correct candidates in the list of the second and subsequent candidates is clicked. In this manner, the customer information can be immediately switched to the customer information of the correct caller recognized by the operator. The programs can be performed without deteriorating customer services based on the caller identification using voice recognition can be appropriately performed.

In the above embodiment, as in the caller identifying system 10 in FIG. 1, the telephone coordination server (CTI server) 18, the customer database server 20, the voice automatic response device (IVR device) 24, the voice recognition server 26, and the operator client 28 are connected to each other as independent devices by the LAN 15. However, although these devices are functionally separated from each other, the plurality of devices may be realized as one device in an actual hardware environment. For example, since the voice automatic response device 24 and the voice recognition server 26 have process operations which are integrated with each other and which cannot be separated from each other, the voice automatic response device 24 and the voice recognition server 26 are integrated with each other as one device. A voice automatic response function and a voice recognition function may be given to the device different applications.

In the above embodiment, as a data structure of the customer database 22, as shown in FIGS. 3A and 3B, the customer database table 44 is separated from the voice database table 46. However, these tables may be united to each other, and a record structure having a customer number, a name, discrimination data, a caller number, and voice data may be registered to one record for each customer, i.e., to one record of a customer.

The present invention includes appropriate modifications without deteriorating the objects and advantages of the invention. In addition, the present invention is not limited to numerical values described in the embodiment.

What is claimed is:

1. A caller identifying method for a system including: an exchange machine which can receive a caller number; a telephone coordination server which coordinates with the exchange machine; a voice automatic response device which automatically responds with voice; a voice recognition device having a voice recognition function; a customer database which registers a plurality of pieces of caller information for a caller number and registers caller voice data for each piece of caller information; and an operator client which is used in voice response of an operator, comprising:
   a caller searching step of notifying a customer database of a caller number received from an exchange machine by the server to search for caller information;
   a voice recognition step of, when pieces of caller information are acquired by the server in the searching operation of the customer database, connecting the exchange machine to a voice automatic response device to acquire predetermined voice data by telephone communication with the caller and comparing the voice data with voice data included in the caller information by a voice recognition device to cause the customer database to generate caller candidate information having priority levels; and
   a caller display step of displaying caller information of a first candidate on the operator client on the basis of the generated caller candidate information, displaying candidate names of second and subsequent candidates as a list, and causing an operation of selecting a candidate in the displayed list to change the caller information being displayed at the present into caller information of a selected candidate.

2. A method according to claim 1, wherein the customer database registers at least customer names, caller numbers, voice data, and customer attribute data in units of customers, and
   on the basis of the caller candidate information from the customer database, the caller display step displays the customer name and the customer attribute data of the first candidate on the display screen, and displays a list of the customer names of the second and subsequent candidates in the order of the candidates at a part of the display screen.

3. A method according to claim 1, wherein the voice recognition step performs a guidance of the same voice response as that of the voice data of the caller information to a caller by the voice automatic response device to acquire the voice data of the caller.

4. A method according to claim 3, wherein the customer database registers the speech data of a customer name as the voice data of a customer, and the voice recognition step performs a guidance of a voice input of the name of a caller by the voice automatic response device to acquire the speech data of the caller name.

5. A computer readable storage for controlling a computer and comprising program causing the computer to execute:
   a caller searching step of notifying a customer database of a caller number received from an exchange machine to search for caller information, said customer database registering a plurality of pieces of caller information for a caller number and registering caller voice data for each piece of caller information;
   a voice recognition step of, when pieces of caller information are acquired in the searching operation of the customer database, connecting the exchange machine to a voice automatic response device to acquire predetermined voice data by telephone communication with the caller and comparing the voice data with voice data included in the caller information by a voice recognition device to cause the customer database to generate caller candidate information having priority levels; and
   a caller display step of displaying caller information of a first candidate on the operator client on the basis of the caller candidate information, displaying candidate names of second and subsequent candidates as a list, and causing an operation of selecting a candidate in the list to change the caller information being displayed at the present into caller information of a selected candidate with the operator client storing custom information comprising a single or more pieces of caller information including voice data for a single caller number is registered and which is searched; and an operator client which is used in voice response of an operator.

6. A storage according to claim 5, wherein the customer database registers at least customer names, caller numbers, voice data, and customer attribute data in units of customers, and
   on the basis of the customer database, the caller display step displays the customer name and the customer attribute data of the first candidate on the display screen, and displays a list of the customer names of the second and subsequent candidates in the order of the candidates at a part of the display screen.

7. A storage according to claim 5, wherein the voice recognition step performs a guidance of the same voice response as that of the voice data of the caller information to a caller by the voice automatic response device to acquire the voice data of the caller.

8. A storage according to claim 7, wherein the customer database registers the pronouncing data of a customer name as the voice data of a customer, and the voice recognition step performs a guidance of a voice input of the name of a caller by the voice automatic response device to acquire the pronouncing data of the caller name.

9. A telephone coordination server apparatus of a system including: an exchange machine which can receive a caller number; a voice automatic response device which automatically responds with voice; a voice recognition device having a voice recognition function; a customer database in which customer information is registered and which searches for the customer information, registers a plurality of pieces of caller information for a caller number, and registers caller voice data for each piece of caller information; and an operator client which is used in voice response of an operator, comprising:

a caller search designation unit which notifies the customer database of a caller number received from the exchange machine to search for caller information;

a voice recognition designation unit which, when pieces of caller information are acquired in the searching operation of the customer database, connects the exchange machine to the voice automatic response device to acquire predetermined voice data by telephone communication with a caller and which compares the voice data with voice data included in the caller information by the voice recognition device to cause the customer database to generate caller candidate information having priority levels; and a caller display designation unit which displays caller information of a first candidate on an operator client on the basis of the generated caller candidate information, which displays candidate names of second and subsequent candidates as a list, and which causes an operation of selecting a candidate in the displayed list to change the caller information being displayed at the present into caller information of a selected candidate with the operator client storing custom information comprising a single or more pieces of caller information including voice data for a single caller number is registered and which is searched; and an operator client which is used in voice response of an operator.

10. An apparatus according to claim 9, wherein the customer database registers at least customer names, caller numbers, voice data, and customer attribute data in units of customers, and on the basis of the customer database, the caller display designation unit displays the customer name and the customer attribute data of the first candidate on the display screen, and displays a list of the customer names of the second and subsequent candidates in the order of the candidates at a part of the display screen.

11. A server apparatus according to claim 9, wherein the voice recognition designation step performs a guidance of the same voice response as that of the voice data of the caller information to a caller by the voice automatic response device to acquire the voice data of the caller.

12. A server apparatus according to claim 11, wherein the customer database registers the pronouncing data of a customer name as the voice data of a customer, and the voice recognition designation unit performs a guidance of a voice input of the name of a caller by the voice automatic response device to acquire the speech data of the caller name.

* * * * *